United States Patent [19]
de Vall

[11] Patent Number: 5,608,417
[45] Date of Patent: Mar. 4, 1997

[54] RF TRANSPONDER SYSTEM WITH PARALLEL RESONANT INTERROGATION SERIES RESONANT RESPONSE

[75] Inventor: Franklin B. de Vall, Boulder, Colo.

[73] Assignee: Palomar Technologies Corporation, Carlsbad, Calif.

[21] Appl. No.: 650,007

[22] Filed: May 16, 1996

Related U.S. Application Data

[63] Continuation of Ser. No. 316,694, Sep. 30, 1994, abandoned.

[51] Int. Cl.$^6$ ................................................ H01Q 1/36
[52] U.S. Cl. ...................... 343/895; 343/867; 340/572
[58] Field of Search ............................... 343/895, 866, 343/867, 741, 742, 749; 340/572; H01Q 1/50, 1/36

[56] References Cited

U.S. PATENT DOCUMENTS

| | | | |
|---|---|---|---|
| 4,583,099 | 4/1986 | Reilly et al. | 343/895 |
| 4,598,276 | 7/1986 | Tait | 340/572 |
| 4,730,188 | 3/1988 | Milheiser | 340/825 |
| 4,876,555 | 10/1989 | Jorgensen | 343/895 |
| 5,317,330 | 5/1994 | Everett et al. | 343/867 |

OTHER PUBLICATIONS

Terman, Radio Enginner's Handbook, McGraw–Hill, 1943, pp. 59–60. no month.

*Primary Examiner*—Hoanganh T. Le
*Attorney, Agent, or Firm*—Rodney F. Brown

[57] ABSTRACT

A transponder system employs a transponder antenna with a distributed inductance and capacitance that exhibit parallel and series resonant frequencies. Transmissions to the transponder circuit are made at one or more parallel resonant frequencies to maximize the excitation of the transponder circuit, while return signals transmitted back from the transponder are modulated at one or more series resonant frequencies to maximize the signal current. The transponder antenna is implemented as a pair of aligned coils on opposite sides of a thin dielectric substrate, with the coils connected together through the substrate at one point and the substrate thickness not more than about 25 microns to obtain a significant mutual inductance between the coils.

19 Claims, 3 Drawing Sheets

RF TRANSPONDER SYSTEM WITH PARALLEL RESONANT INTERROGATION SERIES RESONANT RESPONSE

This is a continuation of U.S. patent application Ser. No. 08/316,694, filed Sep. 30, 1994, now abandoned.

BACKGROUND OF THE INVENTION

1. Field of the Invention

This invention relates to radio frequency (RF) transponder systems, and more particularly to transponders with antenna coils on opposites sides of a card-like substrate.

Description of the Related Art

RF transponder systems are used to monitor for the presence of an object associated with the transponder, to identify the object, and/or to communicate various types of information about the object back to a receiving station. Such systems typically employ an exciter/reader that transmits an RF excitation signal, and a transponder that is energized by the excitation signal to transmit a signal indicating its presence, an identification code and/or other information back to the exciter/reader.

One type of transponder uses an antenna formed on a thin dielectric card such as plastic or paper, mounted with an integrated circuit (IC) transponder chip. Typical applications include transponder tags on clothing and other merchandise that must pass through an exciter reader station to exit the store, thus providing an anti-theft function, airline baggage identification, and security access in general. Flat transponder cards can be used in many applications where bar codes and magnetic strip tags are presently used.

U.S. Pat. No. 4,583,099 to Reilly et al. discloses a transponder card with antenna coils on its opposite sides that are aligned with each other so as to produce a capacitance between the two windings that eliminates the need for a discrete capacitor in the resonant circuit. However, the circuit requires a relatively large winding for a given amount of inductance. It produces a "here-I-am" indication when excited by a signal from an exciter/reader, but beyond that does not provide any identification of the particular article to which it is attached.

U.S. Pat. No. 4,598,276 to Tait described another "here-I-am" transponder card in which a pair of aligned coils are provided on opposite sides of the card and connected through the card at their inner end. The opposed coils are divided into sections, the ends of which are shorted to each other through the card, thus producing discrete inductance and capacitance sections. The patent asserts that, by connecting predetermined portions of the opposing spirals together, the effective capacitance is increased over that resulting if the respective inductors are only capacitively coupled. The circuit's resonant frequency is correspondingly decreased, while the inductance of each loop is not appreciably changed. Similarly current inductively coupled into the connected spirals iS altered, depending on which portions of the spirals are connected. The result is said to be distributed capacitances that reduce eddy currents, thus obtaining a high Q factor and desirable signal emitting characteristics. However, like U.S. Pat. No. 4,583,099, a relatively large winding area is required for a given inductance, and no unique identification or similar information is provided.

The described patents operate by pertubating a transmitted RF signal, rather than generating unique signals for transmission back to the exciter/reader to provide an identification or other information. For transponders having identification or other information transmitting capability, it is particularly important to have an efficient mechanism for both exciting the transponder, and for generating and transmitting back its return information signal. Inefficiencies in transponder operation in either signal direction can limit the system's range, introduce errors and restrict the range of information that can be transmitted.

SUMMARY OF THE INVENTION

The present invention seeks to provide a transponder system that operates with a very high degree of efficiency in both exciting the transponder with an RF excitation signal, and in generating and transmitting a return information signal from the transponder back to the reader/exciter. Another object is the provision of a transponder antenna arrangement that has a greater inductance and capacitance per unit area, and thus either allows for smaller cards or frees up additional space on a given card for other purposes.

These goals are accomplished by implementing the transponder antenna with a pair of windings that are positioned on opposites sides of the transponder substrate and are connected together at one location through the substrate, so as to produce a distributed inductance and capacitance that is characterized by multiple parallel and series resonant frequencies. The transponder circuit is designed to respond to the fundamental parallel resonant frequency, at which maximum voltage is generated by the transponder winding, but to transmit an information signal back to the exciter/reader at a series resonant frequency at which the current in the transponder winding is maximized, thus maximizing the strength of the return signal. The transponder winding preferably has both multiple parallel resonant frequencies and multiple series resonance frequencies. Different parallel resonant frequencies can be used for different purposes, such as energizing the transponder at the fundamental and writing into the transponder circuit at a harmonic. Similarly, different types of information can be returned from the transmitter at different series resonant frequencies.

The transponder's dielectric substrate is made thin enough so that a substantial mutual inductance is developed between the coils on the opposite sides of the substrate. For this purpose, the substrate is not more than about 25 microns thick. The close proximity of the opposed coils also enhances the distributed capacitance. The coils are connected through the substrate only at one end, with their opposite ends connected to the transponder circuit. The net result is a greater inductance and capacitance for a given substrate area, and a higher energization level.

These and other features and advantages of the invention will be apparent to those skilled in the art from the following detailed description, taken together with the accompanying drawings.

DETAILED DESCRIPTION OF THE INVENTION

The invention uses a new highly compact transponder antenna design that is characterized by both parallel and series resonant frequencies, and exploits the different resonant frequencies to optimize both the energization of the transponder circuit with an excitation signal from an exciter/reader, and of an information signal which is returned from the transponder back to the exciter/reader. Specifically, the transponder is excited at a parallel resonant frequency of its antenna, but transmits back to the exciter/receiver at a series resonant frequency. This results in a high voltage drive for the transponder circuit, and a high modulation current for the return signal that creates a greater return signal field strength. The permissible distance between the exciter/reader and the transponder can be increased because of the higher signal strengths.

Figure 1:
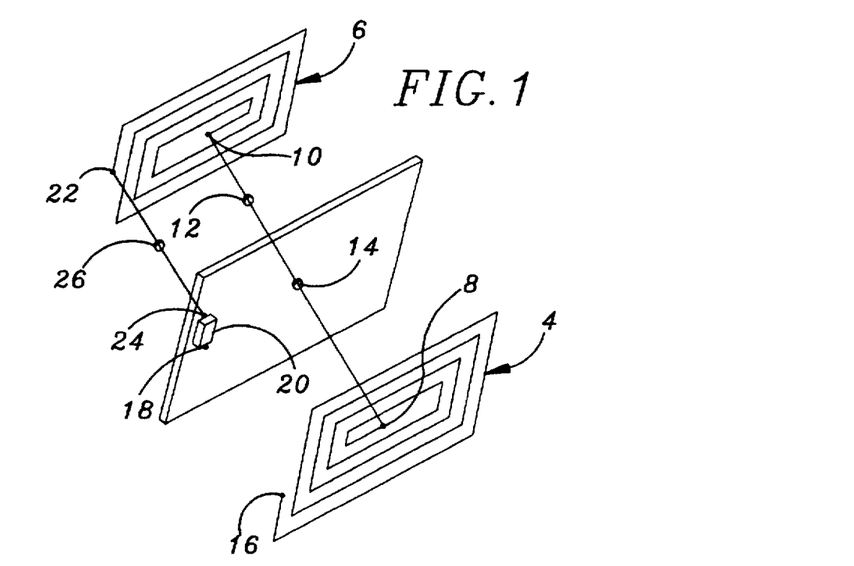
FIG. 1 is an exploded perspective view of a transponder structure in accordance with the invention.

A transponder that operates upon these principles is illustrated in FIG. 1. It is fabricated on a thin dielectric substrate 2, preferably formed from Fleximide material produced by Mitsui Toatsu Company of Japan and distributed in the United States by Rogers Corporation of Arizona. It has a dielectric constant of about 3.2. Antenna coils 4 and 6 are formed on the opposite surfaces of substrate 2 in generally rectangular spirals. The inner ends 8 and 10 of coils 4 and 6 are connected together by a feedthrough 12 such as a soldered or plated-through via, or an insulation displacement connection, that extends through an opening 14 in the substrate. The outer end 16 of coil 4 is connected to one terminal 18 of a transponder circuit which is implemented on an IC chip 20, while the outer end 22 of the other coil 6 is connected to the opposite terminal 24 of transponder circuit 20 by another feedthrough 26 that extends through a corresponding opening in the substrate. Alternately, the chip 20 could be located towards the center of the substrate.

The conductive coils 4 and 6 can be formed on the substrate by processes such as etching, plating, additive deposition or die stamping. In one fabrication technique, a layer of copper is plated directly onto both sides of a Fleximide substrate; Fleximide material will accept a copper plating without an adhesive. A photoresistive coating is then formed over the copper on both sides, and exposed to establish coil patterns that are aligned in registration with each other on opposite sides of the substrate. The unexposed portions of the photoresist and the underlying portions of the copper plating are then etched away, followed by a removal of the exposed photoresist from the remaining copper. The two resulting copper coils on opposite sides of the substrate are positioned in registration with each other, which is important in obtaining high values of capacitance and mutual inductance between the coils.

The two coils are connected together only at their inner ends. Starting from its outer end 16, the first coil 4 follows a counter-clockwise spiral to its inner end 8 as seen in FIG. 1. The electrical connection continues through feedthrough 12 to the inner end 10 of the opposite coil 6, which maintains a counter-clockwise spiral rotation out to its outer end 22. With this orientation the two coils aid each other in establishing a significant mutual inductance. The coils are preferably clustered toward the outer periphery of the substrate, which results in a larger average coil area and allows the coil to encompass more lines of flux for a given number of turns.

Figure 2:
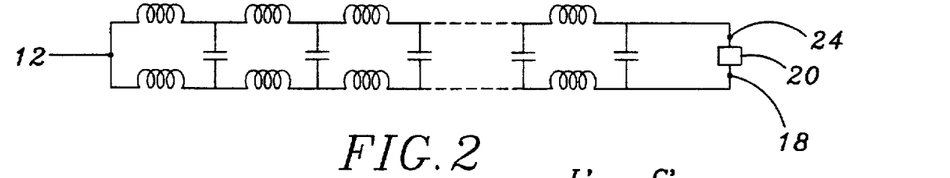
FIG. 2 is an equivalent circuit of the electrical circuit presented by the transponder winding.

An equivalent circuit of the transponder coil configuration is given in FIG. 2. Both the inductance and the capacitance are distributed, as indicated in the figure.

It has been found that, below a certain threshold thickness, the mutual inductance between the two coils increases at a greater than linear rate as the substrate thickness is reduced further. This threshold level has been determined to be a little more than 25 microns. Accordingly, the Fleximide substrate 2 has a thickness of not more than about 25 microns between the opposed coils 4 and 6. Even thinner substrates would be desirable, but are not believed to be commercially available at present. Attaining a significant degree of mutual inductance between the two coils makes the total inductance of the transponder antenna substantially greater than the sum of the coils' individual inductances. This in turn allows the achievable inductance to be increased for a given substrate area, or on the other hand allows the same inductance to be achieved as with prior transponder cards but within a smaller area.

Figure 3A:
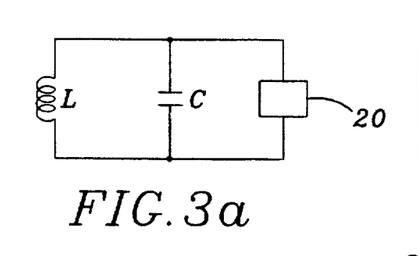
FIGS. 3a and 3b are schematic diagrams illustrating parallel and series resonant circuits, respectively.
Figure 3B:
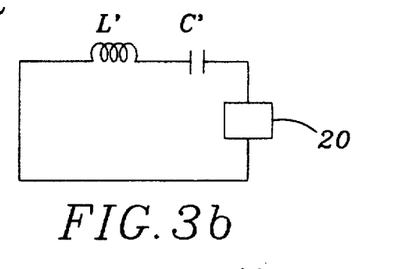

The distributed inductance and capacitance result in multiple alternating parallel and series resonant frequencies, with progressively decreasing Qs as the frequency increases. A simple parallel resonant equivalent circuit is illustrated in FIG. 3a, in which a capacitor C is connected in parallel with an inductor L across the transponder chip 20. At the resonant frequency, equal to $1/2\pi\sqrt{LC}$, the circuit produces a maximum voltage across the transponder chip. A series resonant equivalent circuit is illustrated in FIG. 3b, with the inductor L' and capacitor C' connected in series with the transponder chip. The current rather than the voltage is maximized at the resonant frequency of this circuit.

Figure 4:
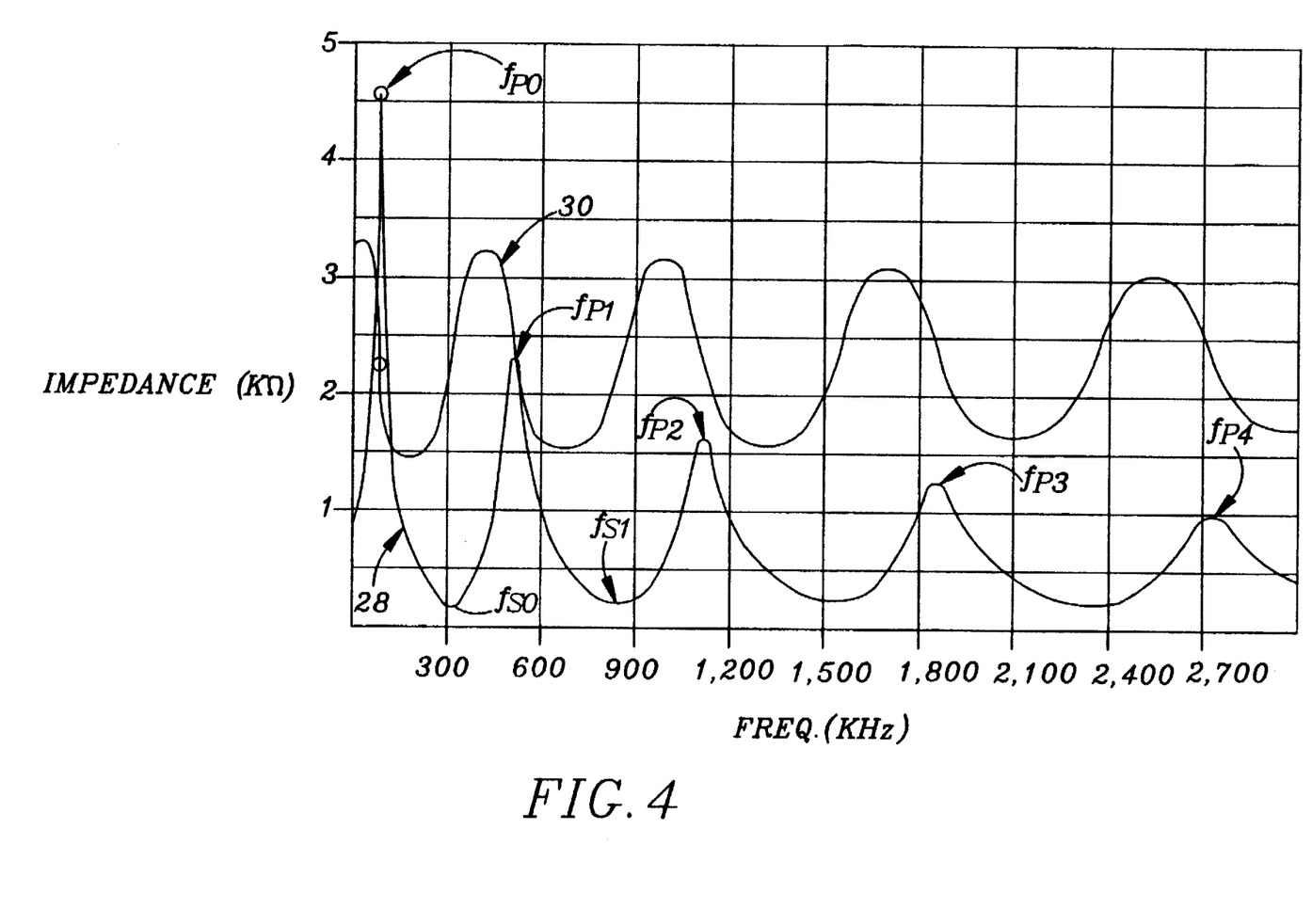
FIG. 4 is a graph illustrating an example of parallel and series resonant frequencies obtained with the invention.

A parallel resonant circuit corresponds to a peak impedance at the parallel resonant frequency, while a series resonant circuit corresponds to a minimum impedance at the series resonant frequency. Both the impedance and phase angle achieved as a function of frequency for one example of the transponder coil construction described herein are shown in the graph of FIG. 4. These results were obtained with rectangular coils having an average width of about 2.6 cm, an average length of about 4.86 cm, and 116 turns per side. A copper winding with a rectangular profile 89 microns wide and 18 microns high was used. The antenna's total inductance at the fundamental parallel resonant frequency of 123.75 KHz was 2 millihenries, of which the individual inductance of each coil was about 0.79 millihenries and about 0.42 millihenries was attributed to mutual inductance between the opposed coils. The effective capacitance of the antenna was 856 picofarads.

In FIG. 4 the transponder winding impedance is indicated by curve 28, and the phase angle by curve 30. The first point of maximum impedance, equal to about 4.5 kilohm, was reached at a frequency of 123.75 KHz; this corresponds to the antenna's fundamental parallel resonant frequency $f_{p0}$. An impedance minimum of 134 ohms was then reached at a frequency of 352 KHz, corresponding to the fundamental series resonant frequency $f_{s0}$. Higher order harmonic parallel resonant points occurred at progressively lower impedances, while higher order harmonic series resonant points had associated impedances that were only slightly changed from the fundamental. Specifically, the first parallel resonant frequency harmonic $f_{p1}$ occurred at 544 KHz with an impedance of 2.3 kilohms, the second harmonic $f_{p2}$ occurred at 1.12 MHz with an impedance of 1.6 kilohms, the third harmonic $f_{p3}$ occurred at 1.85 MHz with an impedance of 1.2 kilohms, and the fourth harmonic $f_{p4}$ occurred at 2.69 MHz with an impedance of 953 ohms. By contrast, the first series resonant harmonic frequency $f_{s1}$ occurred at 876 KHz with an impedance of 128 ohms.

These results were obtained with the compact transponder antenna coil described above, and with a substrate thickness of about 25 microns. With this dimension the mutual inductance factor (the factor by which the total antenna inductance was greater than the sum of the individual coil inductances) was 1.27. Exponentially greater mutual inductance factors, with a corresponding reduction in the necessary coil dimensions, can be obtained by making the substrate even thinner.

The invention utilizes the differing characteristics of the parallel and series resonant points to optimize both the excitation of the transponder circuit and the information signal which it returns to the exciter/reader. The first parallel resonant frequency $f_{po}$ has the highest Q; the exciter frequency is tuned to $f_{po}$ for maximum energy transfer to power the transponder chip circuit. For the return signal, by contrast, the transponder chip operates at a series resonant frequency to drive the transponder antenna as a series resonant circuit; this maximizes the modulating current for the return signal, which results in a greater return signal field strength and range.

The first parallel resonant frequency is a function of the total coil inductance L and capacitance C according to the conventional relationship $f_{po}=1/2\pi\sqrt{+e}$,fra LC +ee . To calculate the effective capacitance C at $f_{po}$ each coil is taken as a capacitor plate, with the capacitance between them varying in positive proportion to the area encompassed by their traces and to the substrate's dielectric constant, and in negative proportion to the substrate thickness. The total inductance L at $f_{po}$ is obtained from the individual coil inductances $L_o$ and the mutual inductance factor m between the opposed coils by $L = 2mL_o$. Each individual coil inductance $L_o$ in turn can be obtained (in microhenrys) from the equation for rectangular coils provided in Terman, *Radio Engineers Handbook*, Mc-Graw Hill, 1943, pages 59–60:

$$L_o = 0.02339n^2 \left[ (s_1 + s_2)\log\left(\frac{2s_1s_2}{nD}\right) - s_1\log(s_1 + g) - s_2\log(s_2 + g) \right] + 0.01016n^2 \left( 2g - \frac{s_1 + s_2}{2} + 0.447nD \right) - 0.01016n(s_1 + s_2)(A + B),$$

where n is the number of turns, $s_1$ and $s_2$ are respectively the average width and average length of the coil, D is the spacing between coil turns, g is the average coil diagonal dimension, and A and B are respectively the diameter to spacing and number of turns corrections from tables provided in the Terman reference. A is based upon the ratio d1/D, where d1 is the diameter of the coil wire, while B is based upon the number of turns. If coil wires with rectangular cross-sections are used, rather than the round wires assumed by Terman, d1 should be set equal to $$2\sqrt{\frac{wh}{\pi}}$$

to obtain an equivalent round wire diameter, where w and h are respectively the width and height of the wire cross-sections.

The invention can also be used to transmit multiple excitation signals at different parallel resonant frequencies and/or to transmit back from the transponder multiple return signals at different series resonant frequencies. For example, one parallel resonant frequency could be used to write an identification code into the transponder chip, and another to excite the transponder to transmit back the identification code or other desired information. Since it generally requires more energy to write to a code circuit than to excite the transponder to read back the code, the fundamental parallel resonant frequency $f_{po}$ would generally be used for the write function, with the first parallel resonant harmonic $f_{p1}$ used to excite a return signal. Similarly, the transponder circuit could be set up to transmit different types of information at different series resonant frequencies in response to excitation from the exciter/reader.

Figure 5:
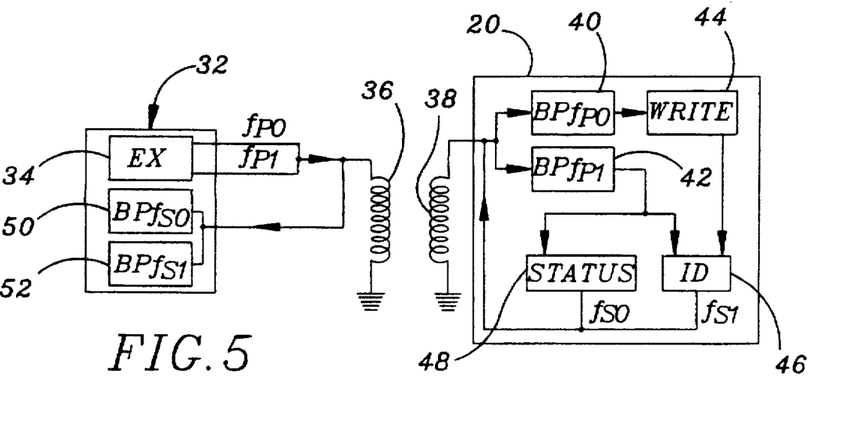
FIG. 5 is a block diagram of exciter/reader and transponder circuitry that can be used to excite the transponder at two different excitation frequencies, and to transmit back to the exciter/reader at two different return frequencies.

FIG. 5 illustrates a simplified transponder system of this type. The exciter/reader 32 includes an exciter section 34 that generates two excitation signals at $f_{po}$ and $f_{p1}$. These signals are transmitted via antenna 36 to a transponder antenna 38 which is implemented in accordance with FIGS. 1 and 2 above. The transponder chip 20 includes bandpass filters 40 and 42 that are tuned to pass $f_{po}$ and $f_{p1}$, respectively. The higher power $f_{po}$ signal can excite one function, such as WRITE 44, while the $f_{p1}$ signal can excite a return transmission back to the exciter/reader 32. Two return signal functions are illustrated: one is an identification code 46 that is either pre-programmed or programmed by the WRITE function 44, and the other is a status function 48 that provides an indication of the circuit status, such as a temperature or pressure reading from a separate sensor. Either the status or the identification signal is generated at the $f_{so}$ modulating frequency, with the other signal generated at the $f_{s1}$ modulating frequency. The signals are retransmitted back to the exciter/reader, where they are separated by respective $f_{so}$ and $f_{s1}$ bandpass filters 50 and 52.

Figure 6:
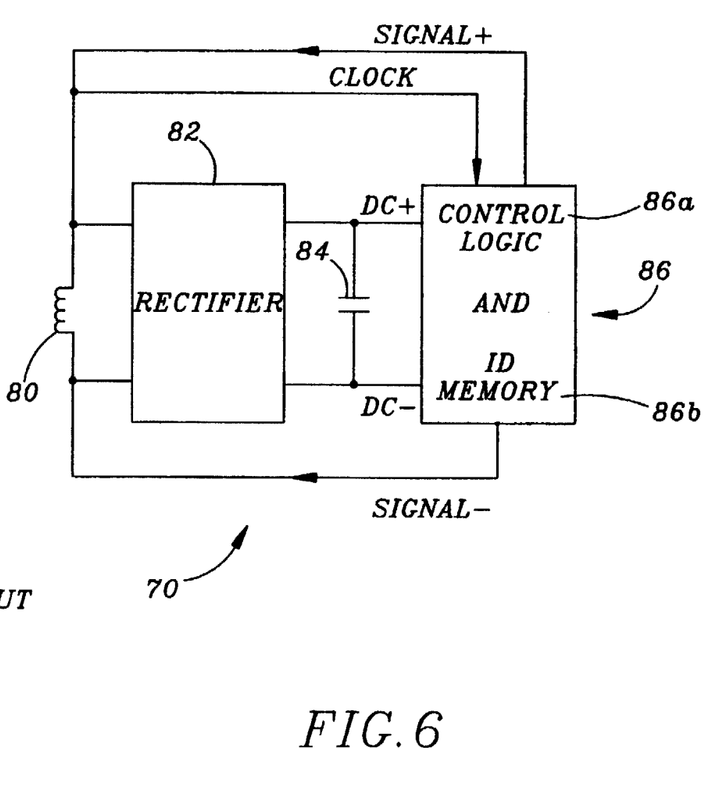
FIG. 6 is a more detailed block diagram of exciter/ reader and transponder circuitry.

A suitable transponder system designed to transmit a single excitation signal at $f_{po}$ and to return a single transponder signal at $f_{so}$ is illustrated in FIG. 6. This is similar to the communications system described in U.S. Pat. No. 4,730,188 to Milheiser, and can be expanded as described above for multiple harmonic signal transmission in either direction. The exciter/reader 54 has three main functional units: an exciter 56, a signal conditioner 58 and demodulation and detection circuits 60. The exciter 54 consists of an AC signal source 62, followed by a power driver 64 which provides a high current, high voltage excitation signal to an antenna coil 66 through a capacitor 68. The antenna coil 66 and the capacitor 68 are selected to resonate at $f_{po}$.

The signal conditioner 58 connects to the antenna 66 and serves to amplify the $f_{so}$ signal returned from the transponder 70, while filtering out the $f_{po}$ excitation signal frequency as well as other noise and undesired signals outside the frequency range used by the transponder signals. It includes a bandpass filter/bandstop filter 72 that actively passes $f_{so}$ and passively excludes $f_{po}$, and an amplifier 74.

The amplified output of the signal conditioner 58 is fed to the demodulation and detection unit 60, which includes frequency shift key (FSK) demodulator 76 and a microcomputer 78. The FSK demodulator 76 is a phase-locked loop circuit, configured as a tone decoder, which gives a digital output as the signal from the transponder shifts between two frequencies. The microcomputer 78 extracts the information, such as a transponder identification code, from this digital output by observing the timing of transitions between the two logic levels. The information obtained by the microcomputer 78 can be transferred to a display or printer, sent over communication lines to a remote point, stored on tape, disk or other storage medium, or sent to another computer.

The transponder 70 includes a double-sided antenna coil 80 as described above, which is positioned such that the magnetic flux generated by the exciter/reader antenna 66 couples energy at $f_{po}$ into the transponder. This energy is converted to a DC voltage using a full-wave rectifier bridge 82 and a smoothing capacitor 84, which are commonly used in power supply circuits. This DC voltage supplies the power to a control logic and identification (or other desired information) memory circuit 86.

The control logic 86a consists of counters and gates which sequentially read out the contents of the identification memory 86b. The logic 86a also inserts a sync word into the signal data stream to allow the exciter/reader to synchronize to the data. The excitation signal which appears on the transponder antenna 80 is supplied to the control logic to provide a clock signal. The control logic circuit 86a inverts the serial data and sync stream into an FSK waveform that is connected to the transponder antenna 80 through complementary current syncs to transmit the FSK identification signal. The transmitted signal is received by the exciter/reader antenna 66, and is amplified by the signal conditioner and detected. The components of the exciter/reader 54 can be implemented as either different units which are connected to each other, or wired together as a single unit.

The invention allows for a greater read range with an inexpensive antenna construction that is adaptable to credit card, patch and other small area transponders, as well as to other transponders that would be assisted by an increase in the return signal power for a given excitation power level. While particular embodiments of the invention have been shown and described, numerous variations and alternate embodiments will occur to those skilled in the art. Accordingly, it is intended that the invention be limited only in terms of the appended claims.

I claim:

1. A transponder communications system, comprising:
   A) a transponder that includes:
      a) means for providing a distributed inductance and capacitance with parallel and series resonance at different respective parallel and series resonant frequencies;
      b) an active return signal generator circuit coupled to said inductance and capacitance means, wherein said return signal generator circuit generates and applies to said inductance and capacitance means a return information signal having one of said series resonant frequencies, and
      c) a power circuit coupled to said inductance and capacitance means and tuned to respond to an actuation signal received by said inductance and capacitance means, said power circuit having one of said parallel resonant frequencies and supplying an energizing signal to said return signal generator circuit; and
   B) an exciter/reader that includes:
      a) a transmitter for transmitting said actuation signal to said transponder at one of said parallel resonant frequencies, and
      b) a receiver for receiving said information signal transmitted from said transponder at said series resonant frequency.

2. The transponder communications system of claim 1, wherein said transmitter and receiver are combined in a transceiver with a common antenna for transmitting signals to and receiving signals from said transponder.

3. The transponder communications system of claim 1, wherein said inductance and capacitance means comprises a dielectric substrate with a pair of mutually connected coils with respective inductances on opposite faces of the substrate, said mutually connected coils having a common winding direction and positioned in substantial registration with each other to produce a substantial mutual inductance that makes the total antenna inductance greater than the sum of the coils' individual inductances.

4. The transponder communications system of claim 3, wherein said dielectric substrate is not more than about 25 microns thick between said mutually connected coils.

5. The transponder communications system of claim 3, wherein said mutually Connected coils generally describe spirals which have respective inner and outer ends and have only one site of mutual connection, said mutual connection being provided by a first electrical connector that extends through the substrate and connects the coils at one end.

6. The transponder communications system of claim 5, wherein said transponder is disposed on the same substrate face as one of said coils and is connected to the opposite end of said one coil, with the opposite end of the other coil connected to the circuit by a second electrical connector that extends through the substrate.

7. The transponder communications system of claim 1, wherein said antenna coil is characterized by multiple parallel resonant frequencies, and said transmitter transmits actuating signals to said transponder at at least two of said parallel resonant frequencies.

8. The transponder communications system of claim 7, said return signal generator circuit comprising a writable identification code circuit that responds to energization at one of said parallel resonant frequencies with an identification code transmitted from said coil at said series resonant frequency, wherein said transmitter transmits a transponder energization signal at said one parallel resonant frequency, and a code write signal at another parallel resonant frequency.

9. The transponder communications system of claim 1, wherein said antenna coil is characterized by multiple series resonant frequencies, and said return signal generator circuit generates and applies to said antenna coil different information signals at different respective series resonant frequencies.

10. A radio frequency (RF) antenna structure, comprising:
    a dielectric substrate,
    a pair of mutually connected antenna coils on opposite sides of said substrate, said coils having a common winding direction, said coils being positioned in substantial registration with each other and said coils characterized by parallel and series resonance at different respective parallel and series resonant frequencies, and
    an active circuit on said substrate that responds to energization from said coils at one of said parallel resonant frequencies by energizing said coils to transmit an information signal at one of said series resonant frequencies,
    said substrate having a thickness between said coils of not more than about 25 microns, thereby enabling a substantial mutual inductance between said coils that makes the total antenna coil inductance greater than the sum of each coils' individual inductance.

11. The RF antenna structure of claim 10, wherein said mutually connected coils generally describe spirals which have respective inner and outer ends and have only one site of mutual connection, said mutual connection being provided by a first electrical connector that extends through the substrate and connects the coils at one end.

12. The RF antenna structure of claim 10, wherein said coils are arranged on said substrate to exhibit multiple parallel resonant frequencies and multiple series resonant frequencies.

13. A radio frequency (RF) antenna structure, comprising:

a dielectric substrate, a pair of mutually connected antenna coils on opposite sides of said substrate which are oriented on the substrate to produce a mutual inductance between the coils that is greater than the sum of their individual inductances, said coils being characterized by parallel and series resonance at different respective parallel and series resonant frequencies and generally describing spirals which have respective inner and outer ends and have only one site of mutual connection, said mutual connection being provided by an electrical connector that extends through the substrate and connects the coils' inner ends, and an active circuit on said substrate that responds to energization from said coils at one of said parallel resonant frequencies by energizing said coils to transmit an information signal at one of said series resonant frequencies.

14. The RF antenna structure of claim 13, wherein said coils are arranged on said substrate with a distributed inductance and capacitance characterized by parallel and series resonance at different respective parallel and series resonant frequencies.

15. The RF antenna structure of claim 14, wherein said coils are arranged on said substrate to exhibit multiple parallel resonant frequencies and multiple series resonant frequencies.

16. A radio frequency (RF) transponder, comprising:

a dielectric substrate, means formed on said substrate for providing a distributed inductance and capacitance characterized by parallel and series resonance at different respective parallel and series resonance frequencies, an active signal generator coupled to said inductance and capacitance means and positioned on said substrate, wherein said active signal generator generates and applies to said inductance and capacitance means an information signal at one of said series resonant frequencies, and a power circuit on said substrate for supplying an energizing signal to said active signal generator when said inductance and capacitance means receives an actuation signal generated by a remotely-located exciter/reader at one of said parallel resonant frequencies.

17. The RF transponder of claim 16 wherein said inductance and capacitance means comprises a pair of mutually connected coils with respective inductances on opposite faces of the dielectric substrate, said mutually connected coils having a common winding direction and positioned in substantial registration with each other to produce a substantial mutual inductance that makes the total antenna inductance greater than the sum of the coils' individual inductances.

18. The RF transponder of claim 17, wherein said dielectric substrate is not more than about 25 microns thick between said mutually connected coils.

19. The RF transponder of claim 16, wherein said inductance and capacitance means is characterized by multiple series resonant frequencies, and said active signal generator generates and applies to said inductance and capacitance means different information signals at different respective series resonant frequencies.

* * * * *

UNITED STATES PATENT AND TRADEMARK OFFICE
CERTIFICATE OF CORRECTION

PATENT NO. : 5,608,417
DATED : March 4, 1997
INVENTOR(S) : Franklin B. de Vall

It is certified that error appears in the above-indentified patent and that said Letters Patent is hereby corrected as shown below:

Column 1, line 57: delete "iS" and insert --is--.

Column 5, line 30: delete "$f_{po}=1/2\pi\sqrt{}+e$, fra LC +ee" and insert -- $f_{po}=1/2\pi\sqrt{LC}$ --.

Column 8, Claim 5, line 13: delete "Connected" and insert --connected--.

Signed and Sealed this

Seventeenth Day of June, 1997

Attest:

BRUCE LEHMAN

Attesting Officer         Commissioner of Patents and Trademarks

UNITED STATES PATENT AND TRADEMARK OFFICE
CERTIFICATE OF CORRECTION

PATENT NO. : 5,608,417

DATED : March 4, 1997

INVENTOR(S) : Franklin B. de Vall

It is certified that error appears in the above-indentified patent and that said Letters Patent is hereby corrected as shown below:

Column 8, Claim 7, line 25: delete "antenna coil" and insert --inductance and capacitance means--.

Column 8, Claim 9, line 39: delete "antenna coil" and insert --inductance and capacitance means--.

Column 8, Claim 9, line 41: delete "antenna coil" and insert --inductance and capacitance means--.

Signed and Sealed this

Ninth Day of September, 1997

Attest:

BRUCE LEHMAN

Attesting Officer

Commissioner of Patents and Trademarks